United States Patent [19]

Tsuji et al.

[11] 4,402,387
[45] Sep. 6, 1983

[54] ELEVATOR CONTROL SYSTEM

[75] Inventors: Shintaro Tsuji; Toshiyuki Kamohara, both of Aichi, Japan

[73] Assignee: Mitsubishi Denki Kabushiki Kaisha, Tokyo, Japan

[21] Appl. No.: 285,687

[22] Filed: Jul. 21, 1981

[51] Int. Cl.³ ............................................. B66B 1/30
[52] U.S. Cl. .................................... 187/29 R; 318/561
[58] Field of Search ................. 187/29; 318/162, 163, 318/561

[56] References Cited

U.S. PATENT DOCUMENTS

| | | | |
|---|---|---|---|
| 3,828,236 | 8/1974 | Close | 318/561 |
| 4,064,444 | 12/1977 | Hoang | 318/561 |
| 4,124,101 | 11/1978 | Satoh | 187/29 |
| 4,131,182 | 12/1978 | Bass | 187/29 |
| 4,155,426 | 5/1979 | Booker, Jr. | 187/29 |
| 4,279,013 | 7/1981 | Cameron et al. | 318/561 X |

Primary Examiner—J. V. Truhe
Assistant Examiner—W. E. Duncanson, Jr.
Attorney, Agent, or Firm—Sughrue, Mion, Zinn, Macpeak and Seas

[57] ABSTRACT

An elevator control system for operating the cage of an elevator wherein the cage is run from one floor to the next floor at which it is to be stopped with a minimum amount of energy consumption. Energy consumption estimating circuits produce estimates of the amount of energy required for the cage to run to the next floor at which it is to be stopped for a plurality of different maximum cage speeds. The outputs of the energy consumption estimating circuits are coupled to a minimum value selecting circuit which determines which of the energy consumption estimating circuits has produced the lowest estimate. The elevator cage is then run at a speed profile and at a maximum speed chosen in correspondence with the minimum energy consumption.

6 Claims, 10 Drawing Figures

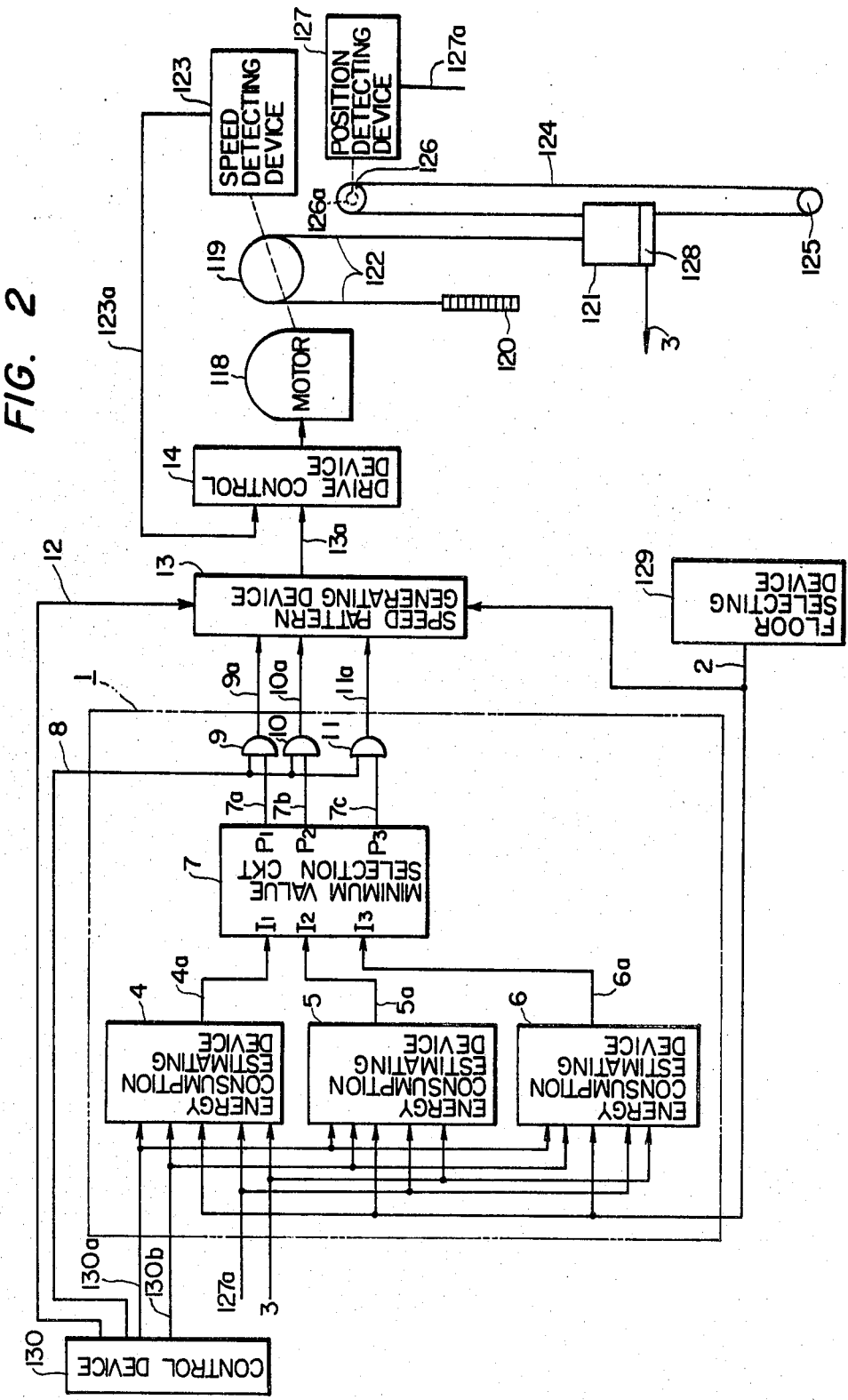

| ADDRESS | DATA |
|---------|------|
| A | 1 |
| BO | 10 |
| BI | 15 |
| CI | 5 |
| V | 4 |
| H | 3.5 |

| ADDRESS |
|---------|
| P |
| F |
| U |
| D |
| W |
| L |
| B |
| C |
| E |

ELEVATOR CONTROL SYSTEM

BACKGROUND OF THE INVENTION

The present invention relates to an improved elevator control system.

In general, the electric power consumed by an elevator is roughly divided into:

(a) power consumed by the hoisting motor and the hoisting unit, (b) power consumed by the motor generator, (c) power consumed by the control device, (d) power consumed by illuminating lamps, electric fan, position indicating lamps, etc. in the cage, and (e) power consumed by lamps used for indicating floor calls, position indicating lamps, cage arrival indicating lamps, etc. provided at each floor.

Among the powers consumptions described in paragraphs (a) through (e), those in paragraphs (a) and (b) are consumed as the cage moves. FIG. 1 shows variation of power consumption during the period from the start of the cage until the cage reaches a floor where it should be stopped. In FIG. 1, reference character $T_1$ designates in acceleration period, $T_1$ a constant speed running period, and $T_3$ a deceleration period. Further in FIG. 1, a power consumption curve a corresponds to the case where the cage is moved upwardly at its rated load or it is moved downwardly with no load. When the cage is started, the power consumption abruptly increases. Thereafter, the difference between the rated load and the counterweight (a weight corresponding to about 50% of the rated load) is lifted, and therefore the power consumption is maintained substantially unchanged. As the cage is decelerated, regenerative power is produced although this is considerably small.

A power consumption curve b in FIG. 1 corresponds to the case where the cage is moved upwardly with no load or moved downwardly with the rated load. Similarly as for the curve a, when the cage is started, the curve has a peak. This peak, however, is smaller than the peak of the curve a. After the occurrence of the peak, the weight corresponding to 50% of the rated load is moved downwardly, and therefore potential energy is recovered, as regenerative power, by the power source. However, the amount of power actually recovered is very small because of various losses such as frictional losses and thermal losses.

Thus it may be said that, when the cage runs a certain distance, as is apparent from FIG. 1, the amount of power consumed changes depending on the cage load and the cage's maximum speed. However, in a conventional speed control system, the cage is run at maximum speed irrespective of the cage load and running distance. Therefore, the conventional speed control system is disadvantageous in that power is not economically used.

An operating method has been employed in which, when the frequency of use of an elevator is relatively small, a predetermined number of cages are operated with the maximum speed decreased, for example, to 120 m/min from 240 m/min. However, the power consumption does not always decrease, depending on cage loads and running distances, and therefore that operating method is not always effective in power reduction. Furthermore, the operating method is disadvantageous in that it takes a longer time for the cage to reach the designated floor because of the reduction in speed.

SUMMARY OF THE INVENTION

Accordingly, an object of the invention is to eliminate the above-described difficulties accompanying a conventional elevator control system. More specifically, an object of the invention is to provide an elevator control system with which an elevator can be operated with less power consumption.

In accordance with these and other objects of the invention, there is provided an elevator control system for operating the cage of an elevator at a speed according to one or more speed patterns. The control system includes an energy consumption estimating means for estimating the amount of energy required for the cage to run to a floor where it is to be next stopped, speed setting means for setting the speed at which the cage runs to the next floor at which the amount of energy required for this movement is minimized, and speed pattern generating means for generating a speed pattern corresponding to the cage speed set by the speed setting means. Preferably, plural energy consumption estimating means are provided, each of which corresponds to a separate predetermined maximum speed of the elevator cage. In this case, a minimum value selecting circuit determines which of the energy consumption estimating means has produced the lowest estimate of the required amount of energy. The elevator cage is then run with a speed pattern chosen in correspondence with the minimum required energy and hence corresponding maximum speed.

Further, there may be included running time estimating means for estimating a running time required for the cage to run to the next floor where it is to be stopped. The output of the running time estimating means and the output of the energy consumption estimating means are combined mathematically to thereby set a cage speed wherein the cage runs to the floor where it is to be stopped at a speed at which an evaluation value is minimized.

BRIEF DESCRIPTION OF THE DRAWINGS

FIG. 2 is a block diagram showing an example of an elevator control system according to the invention;

BRIEF DESCRIPTION OF THE PREFERRED EMBODIMENTS

Figure 1:
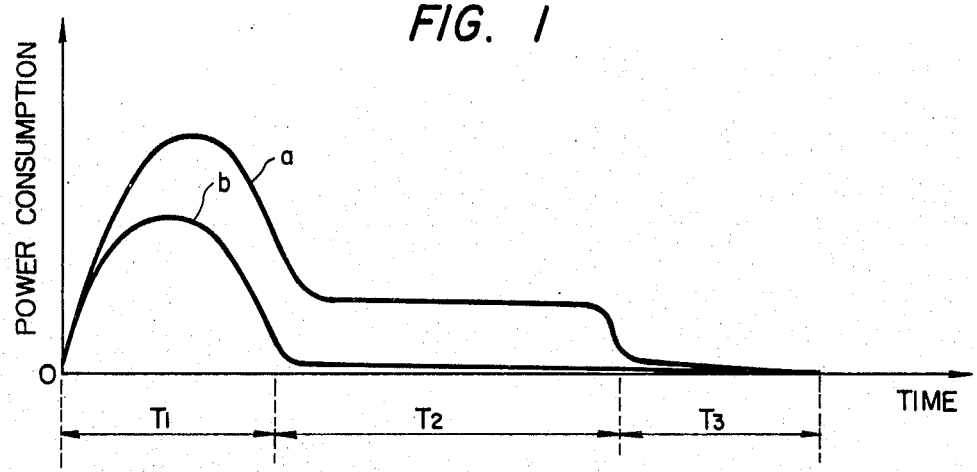
FIG. 1 is a graphical representation indicating power consumption curves of an elevator.

A preferred embodiment of the invention will be described with reference to FIGS. 2 through 8. For convenience in description, it is assumed that a cage whose highest speed is variable in a range of from 240 m/min to 120 m/min is installed in a building with fifteen stories.

In FIG. 2, reference numeral 121 designates the cage of an elevator, 120 a counterweight, 122 a main cable, 118 a hoisting unit, 119 the cable sheave of the hoisting unit 118, 123a speed detecting device for detecting the speed of the cage where a tachometer coupled to the sheave 119 to output a cage speed signal 123a, 124 a cable both ends of which are connected in the form of an endless cable to the cage 120, 125 a tension pulley for imparting tension to the cable 124 with the tension pulley being disposed in the lower portion of a cage lifting path or a shaft, 126 a disc arranged in a machine room and having small holes 126a formed at equal intervals along the circumferential portion thereof with the cable 124 being laid over the disc 126, and 127 a conventional position detecting device. The position detecting device 127 produces a pulse whenever it detects a small hole 126a. When the cage is moved upwardly, the position detecting device 127 adds pulse to a count and when the cage is moved downwardly, it subtracts pulses from the count, thereby to detect the present position of the cage and to output a cage position floor signal 127a representing the present position.

Further in FIG. 2, reference numeral 128 designates a conventional cage load detecting device provided on the floor of the cage 121, the detecting device 128 detecting the load in the cage, which is represented by a percentage (%) with respect to the rated load of the cage 121, thereby to output a cage load signal 3. (A detailed description of the detecting device 128 is omitted since it is conventional.) Reference numeral 129 designates a conventional floor selecting device for determining a floor where the cage should be stopped and to output a stop-designating floor signal 2, and 130 a conventional control device which operates to set the direction of movement of the cage when the cage responds to a cage call or a floor call and to control the opening of the door of the cage 121.

Also, in FIG. 2, reference character $130\mu$ designates an upward signal from the control device 130 which is at a high logic level "H" when the cage 121 is moved upwardly, $130d$ 1 a downward signal from the control device 130 which is at the "H" level when the cage 121 is moved downwardly, 1 a speed setting device for setting the maximum speed of the cage, and 4, 5 and 6 energy consumption estimating devices which are used when the cage's maximum speeds are 240 m/min, 180 m/min and 120 m/min, respectively. Using the cage position floor signal 127a, the stop-designating floor signal 2, the upward signal $130\mu$ and the downward signal $130d$, the devices 4 through 6 estimate the power consumption required for the cage to move to a floor where the cage should be next stopped for the respective maximum speeds and output energy consumption signals 4a, 5a and 6a.

Figure 3:
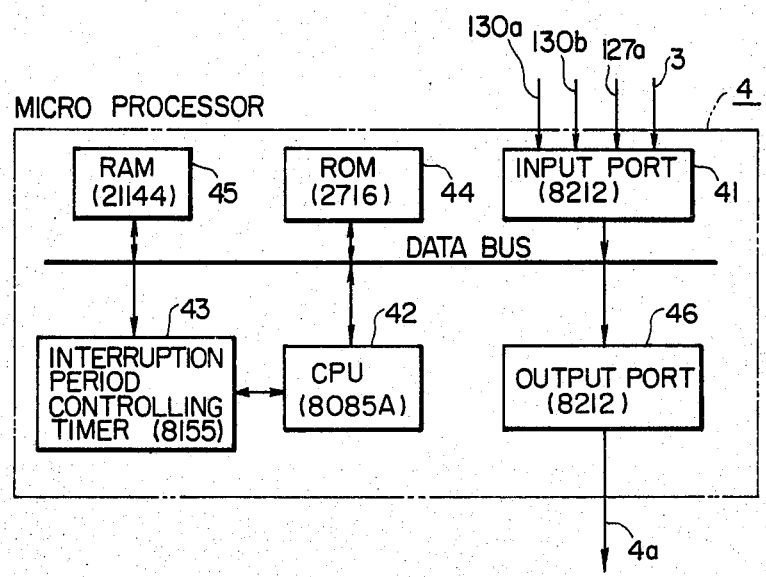
FIG. 3 is a block diagram showing an energy consumption estimating device in FIG. 2.

Each of the energy consumption estimating devices 4 through 6, as shown in FIG. 3, includes an input port 41 (INTEL type 8212), a central processing unit or a CPU 42 (INTEL type 8085A), an interruption period controlling timer 43 (INTEL type 8155), a read-only memory (ROM) 44 (INTEL type 2716), a random access memory (RAM) 45 (INTEL type 2114A), and an output port 46 (INTEL type 8212). That is, each of the devices 4 through 6 is constituted by a microprocessor system (INTEL type 8085 system). However, the invention is not limited thereto or thereby and it may be implemented with another suitable microprocessor, digital circuits or analog circuits.

Figures 4, 5, 8:
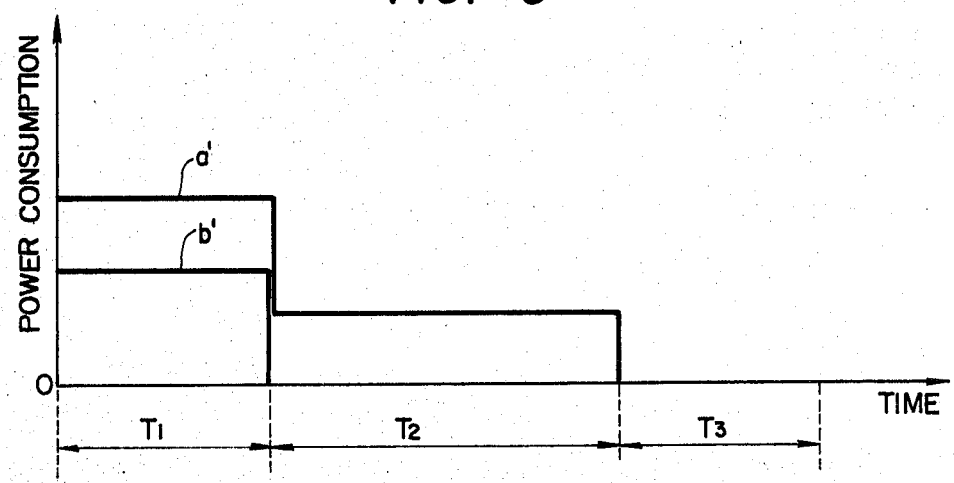
FIG. 4 is an explanatory diagram showing the arrangement of a ROM in FIG. 3.
FIG. 5 is an explanatory diagram showing the arrangement of a RAM in FIG. 3.
FIG. 8 is a diagram indicating power consumption curves approximating the elevator power consumption curves in FIG. 1.
Figure 6:
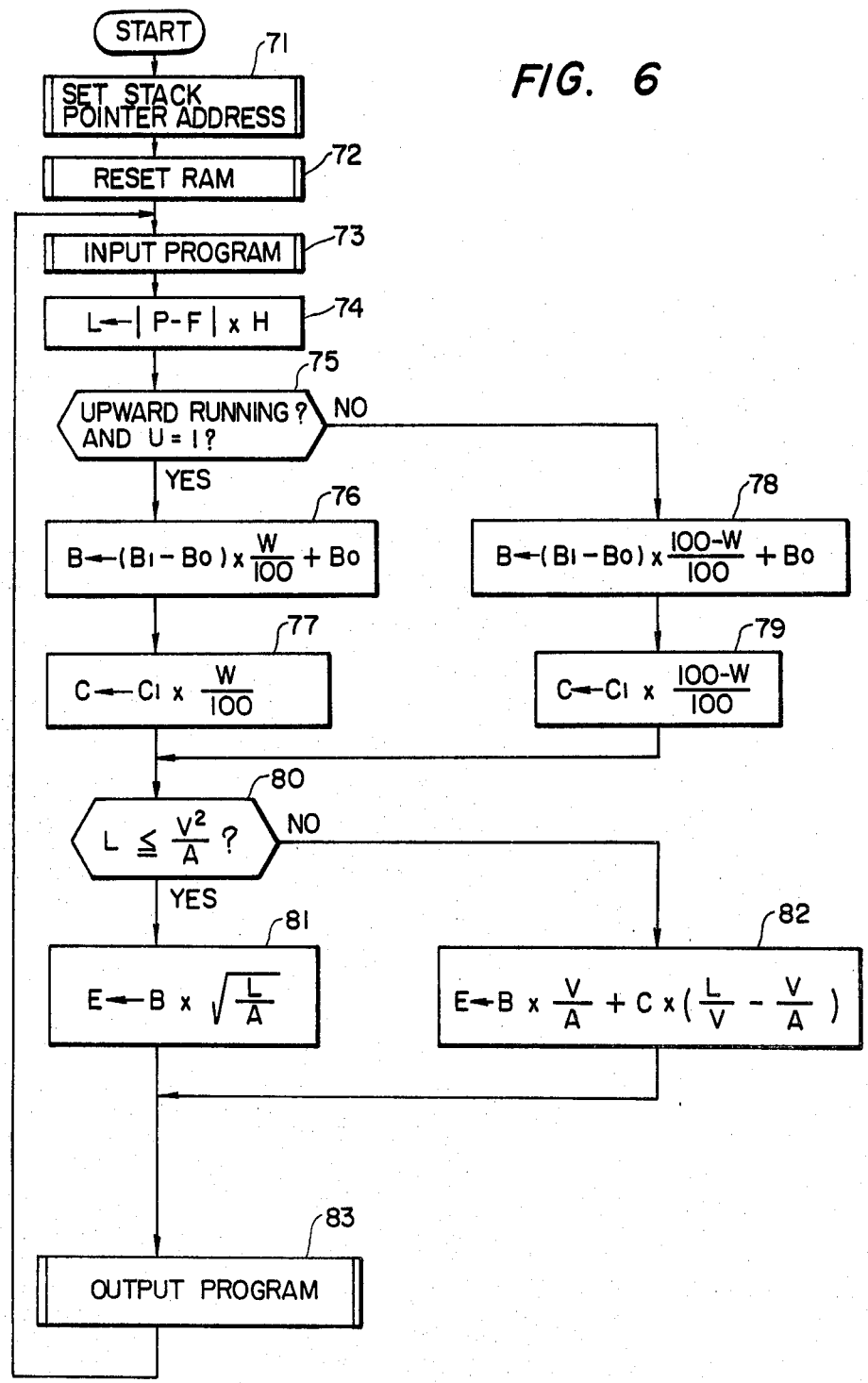
FIG. 6 is a flow chart showing operating steps of the energy consumption estimating device in FIG. 2.

The devices 4 through 6 operate in accordance with an operating procedure shown in FIG. 6. Data addresses and contents are set in the ROM 44 as shown in FIG. 4, and data addresses are set in the RAM 45 as shown in FIG. 5. Among the data in the ROM 44 and the RAM 45, the data bit U is an "upward" data bit which is raised to "1" when the cage 121 is moving upwardly, the data bit D represents a "downward" data bit which is raised to "1" when the cage 121 is moving downwardly, and the remaining data is identified by the symbols in expressions (1) through (4) described below.

Referring back to FIG. 2, reference numeral 7 designates a minimum value selection circuit which operates to select out of input signals applied to its input terminals $I_1$, $I_2$ and $I_3$ the one having the minimum value and to output the selected signal as a corresponding one of selection signals 7a, 7b and 7c through its output terminals $P_1$, $P_2$ and $P_3$, respectively. For instance, if the input signal at the input terminal $I_1$ has the minimum value, the output signal 7a at the output terminal $P_1$ is at "H" and the remaining output signals are at "L".

Figure 7:
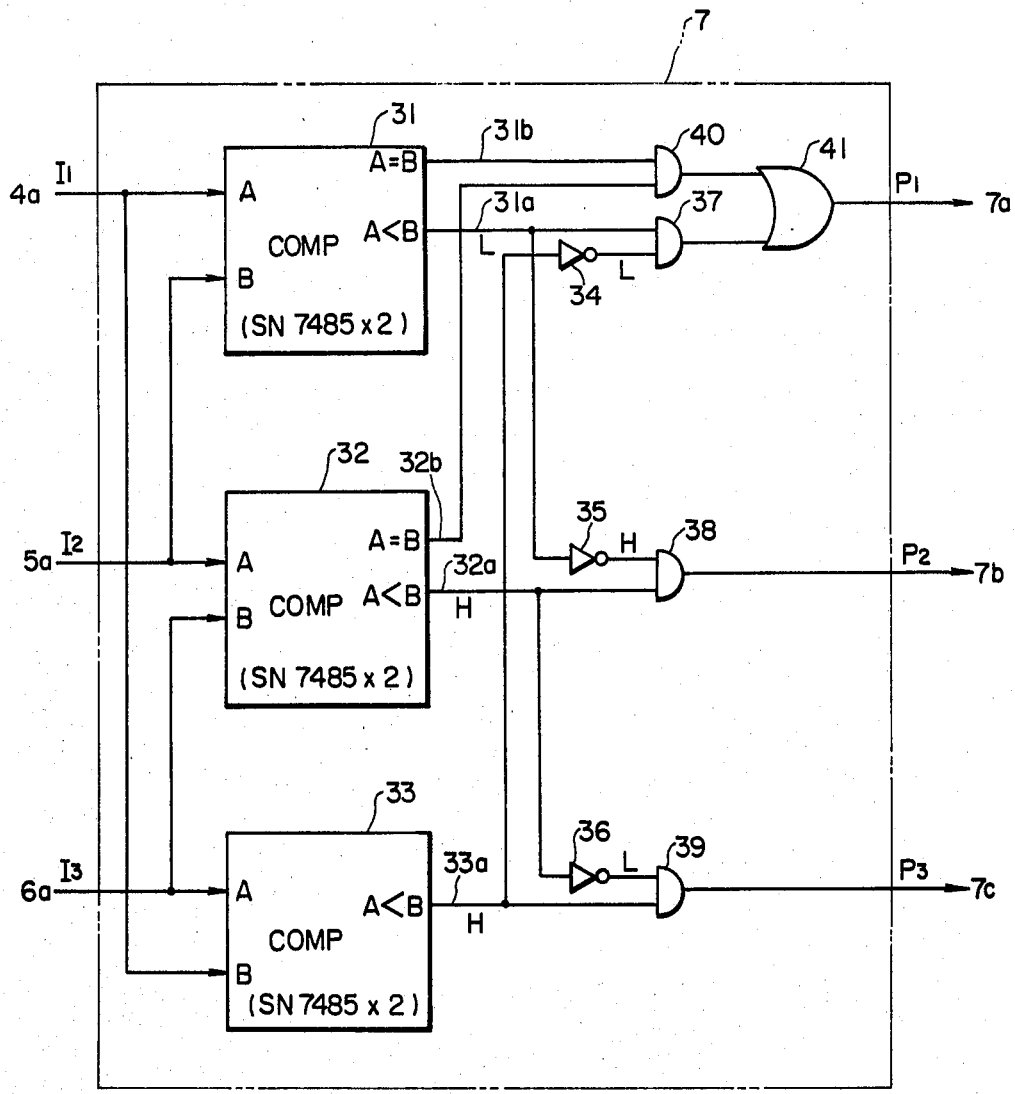
FIG. 7 is a block diagram showing a minimum value selecting circuit in FIG. 2.

More specifically, the selection circuit 7, as shown in FIG. 7, includes 8-bit data comparators 31, 32 and 33 each of which is formed with two magnitude comparators (Texas Instruments type SN7485); inverters 34, 35 and 36; AND gates 37 through 40; and an OR gate 41. The comparators 31 through 33 produce signals 31a, 32a and 33a which are raised to "H" when the input A is greater than the input B thereto while the comparators 31 and 32 produce signals 31b and 32b which are raised to "H" when the input A is equal to the input B.

Further in FIG. 2, reference numeral 8 designates a start instruction signal from the control device 130 which is raised to "H" when the door of the cage starts closing to respond to the next call and is set to "L" when the cage stops, 9 through 11 AND gates, and 9a through 11a the output signals of the AND gates 9 through 11. More specifically, the output signals 9a through 11a are maximum speed specifying signals which are raised to "H" for corresponding specified maximum speeds of 240 m/min, 180 m/min and 120 m/min, respectively. Reference numeral 12 designates a running instruction signal from the control device 130 which is raised to "H" when the cage starts and is set to "L" when the cage stops and 13 indicates a speed pattern (speed instruction profile) generating device for generating a speed pattern 12a (i.e. an acceleration pattern, a constant speed pattern or a deceleration pattern) when the running instruction signal is raised to "H". The speed pattern generating device 13 generates a speed pattern 13a according to the maximum speed (240 m/min, 180 m/min or 120 m/min) specified by the maximum speed instruction signal (9a, 10a or 11a) when the running instruction signal 12 changes from "L" to "H". Details of the speed pattern generating device 13 are described in U.S. Pat. No. 4,136,758. It should be noted that the highest speed is maintained unchanged until the cage is stopped.

Further in FIG. 2, reference numeral 14 designates a drive control device for driving the hoisting unit 118. The drive control device 14 controls the hoisting unit 118 such that the difference between the speed pattern 13a from the speed pattern generating device 13 and the speed signal 123a from the speed detecting device 123 is zero.

In FIG. 8, reference character a' indicates a power consumption curve approximating the power consumption curve a in FIG. 1, and b' a power consumption curve approximating the power consumption curve b in FIG. 1.

The operation of the elevator control system thus constructed will be described.

For this discussion, it is assumed that the cage is on the first floor is goint to start in response to an upward call from the fifth floor.

In the power consumption estimating devices 4 through 6, the power consumption curve are approximated as shown in FIG. 8 to estimate the power consumption. This can be represented by the following expressions:

$$E = B \times \sqrt{L/A}, \text{ when } L \leq V^2/A, \text{ and} \quad (1)$$

$$= B \times V/A + C \times (L/V - V/A), \text{ when } L > V^2/A, \quad (2)$$

where $$\left. \begin{array}{l} B = (B_1 - B_0) \times W/100 + B_0, \\ C = C_1 \times W/100, \end{array} \right\} \begin{array}{l} \text{(for upward movement)} \end{array} \quad (3)$$

$$\left. \begin{array}{l} B = (B_1 - B_0) \times (100 - W)/100 + B_0, \\ C = C_1 \times (100 - W)/100, \end{array} \right\} \begin{array}{l} \text{(for downward movement)} \end{array} \quad (4)$$

$E$: estimated energy consumption (watt-seconds),
$B_1$: power consumption (watts) for upward acceleration under 100% load,
$B_0$: power consumption (watts) for upward acceleration under 0% load,
$C_1$: power consumption (watts) when the cage is run upwardly at a constant speed with 100% load, and
$F$: running distance (m).
$L = |P - F| \times H$
where,
$P$: cage position floor (floor),
$F$: stop-designated floor (floor),
$H$: floor height (m/floor),
$A$: cage acceleration (m/sec$^2$), and
$V$: cage maximum speed (m/sec).

In the case where the maximum speed of the cage is 240 m/min (or V=4 m/sec), when the power switch of the power consumption estimating device 4 is turned on, the programs 71 through 82 stored in the ROM 44 are activated. Thus, in Step 71, an stack pointer address is set, and in Step 72 all the data in the RAM 45 is cleared. Next, with the input program 73, through the input port 41 the content of the cage position floor signal 127a is set to cage position floor data P, the content of the stop-designated signal 2 is set to stop-designated floor data F, and the content of the cage load signal 3 is set to cage load data W. Furthermore, when the upward signal 130μ is at "H", data bit U is set to "1", and when it is at "L", the upward data bit U is set to "0". When the downward signal 130d is at "H", the downward data bit D is set to "1", and when it is at "L", the downward data bit D is set to "0".

If, for instance, $B_1 = 15$ watts, $B_0 = 10$ watts, $C_1 = 5$ watts, H=3.5 m/floor, A=1 m/sec$^2$ and V=4 m/sec (FIG. 4), the cage starts with a 100% load (W=100), the running distance L is 14 m ($L = |P-F| \times H = |5-1| \times 3.5 = 14$) in Step 74. For upward running, U="1", and the operation is advanced in the order of Steps 75 and 76 and B=(15−10)×(100/100)+10=15 watts (Expression (3)) is calculated. In Step 77, C=5×(100/100)=5 watts is obtained (Expression (3)).

In Step 80, the running distance L=14 m. Because $L < V^2/A$ (=16), the operation is advanced to Step 81 where the energy consumption estimated value E=1−5×√14/1=56 watt-seconds (Expression (1)) is calculated. Then, according to the output program in Step 83, the energy consumption signal 4a is outputted (representing 56 watt-seconds in this case) through the output port 46. Then, the operation is returned to Step 73 and Steps 73 through 83 are carried out repeatedly.

Similarly, in the cases where the cage's maximum speeds are 180 m/min (V=3 m/sec) and 120 m/min (V=2 m/sec), the energy consumption signals 5a and 6a are outputted (representing 53 watt-seconds and 55 watt-seconds) by the power consumption estimating devices 5 and 6 with the calculations being performed according to Expressions (3) and (2), respectively. In these calculation results, fractions are omitted.

Accordingly, in the minimum value selecting circuit 7, the output signals 31a, 32a and 33a from the comparators 31, 32 and 33 are set to "L", "H" and "H", respectively. Hence, the outputs of the inverters 34, 35 and 36 are "L", "H" and "L", the respectively. Therefore, the output of the AND gate 37 is set to "L", the output of the OR gate 41 is set to "L", the output of the AND gate 38 is raised to "H", and the output of the AND gate 39 is set to "L". As a result, the signal 5a at the terminal for the input I$_2$ having the minimum value is selected and the selection signal 7b at the terminal P$_2$ is at "H" while the remaining signals 7a and 7c are at "L".

When the cage starts closing the door, the start instruction signal 8 is raised to "H" and therefore the AND gates 9 through 11 output the maximum speed specification signals 9a, 10a and 11a which are respectively at "L", "H" and "L".

When the cage becomes ready for starting after closing the door, the speed pattern generating device 13 generates a speed pattern according to the maximum speed (180 m/min) which has been specified by the maximum speed specification signals 9a through 11a at the time instant that the running instruction signal 12 changes from "L" to "H". The drive control device 14 controls the hoisting motor so that the cage speed 23a follows the speed pattern 13a thereby causing the cage to run to the designated floor.

If the cage is run from the fifth floor to the first floor at the maximum speed of 240 m/min with no load (W=0), the operation is advanced from Step 75 to Step 78, where B=(15−10)×[(100−0)/100]+10=15 watts is calculated (Expression (4)). In Step 79, C=5×[(100−0)/100] is calculated (Expression (4)). In this case, similarly as for upward movement of the cage with a 100% load, the outputted energy consumption signal is 56 watt-seconds. Thus, in the case also where the cage moves downwardly four floors with no load, the maximum speed is set to 180 m/min.

In the case where the cage is run from the first floor to the fifth floor with a 50% load, the energy consumption signals 8a, 5a and 6a are 46 watt-seconds, 41 watt-seconds and 37 watt-seconds for maximum speeds of 240 m/min, 180 m/min and 120 m/min. repectively. Therefore, the total energy consumption can be reduced by running the cage at the maximum speed of 120 m/min.

When the cage is run upwardly with a 100% load or downwardly with no load, for example, for three, six or ten floors, the estimated energy consumptions (watt-seconds) with the highest speeds are as indicated in the following table:

| Number of floors | Highest speed m/min | | |
|---|---|---|---|
| | 240 | 180 | 120 |
| 3 | 48 | 47 | 46 |
| 6 | 66 | 65 | 72 |
| 10 | 83 | 88 | 107 |

As is clear from the above table, in the case where the cage is moved upwardly with a 100% load or downwardly with no load, it is most economical that the maximum speed be set to 120 m/min, 180 m/min and 240 m/min respectively when the cage is run for three, six and ten floors.

As is clear from the above description, in the above-described elevator control system, energy consumptions required for the running of the cage are estimated according to the cage load, the number of floor distances through which the cage must pass, and the cage running direction. The maximum speed is selected at which the minimum power is consumed.

Another embodiment of the invention will be described with reference to FIGS. 9 and 10.

Figure 9:
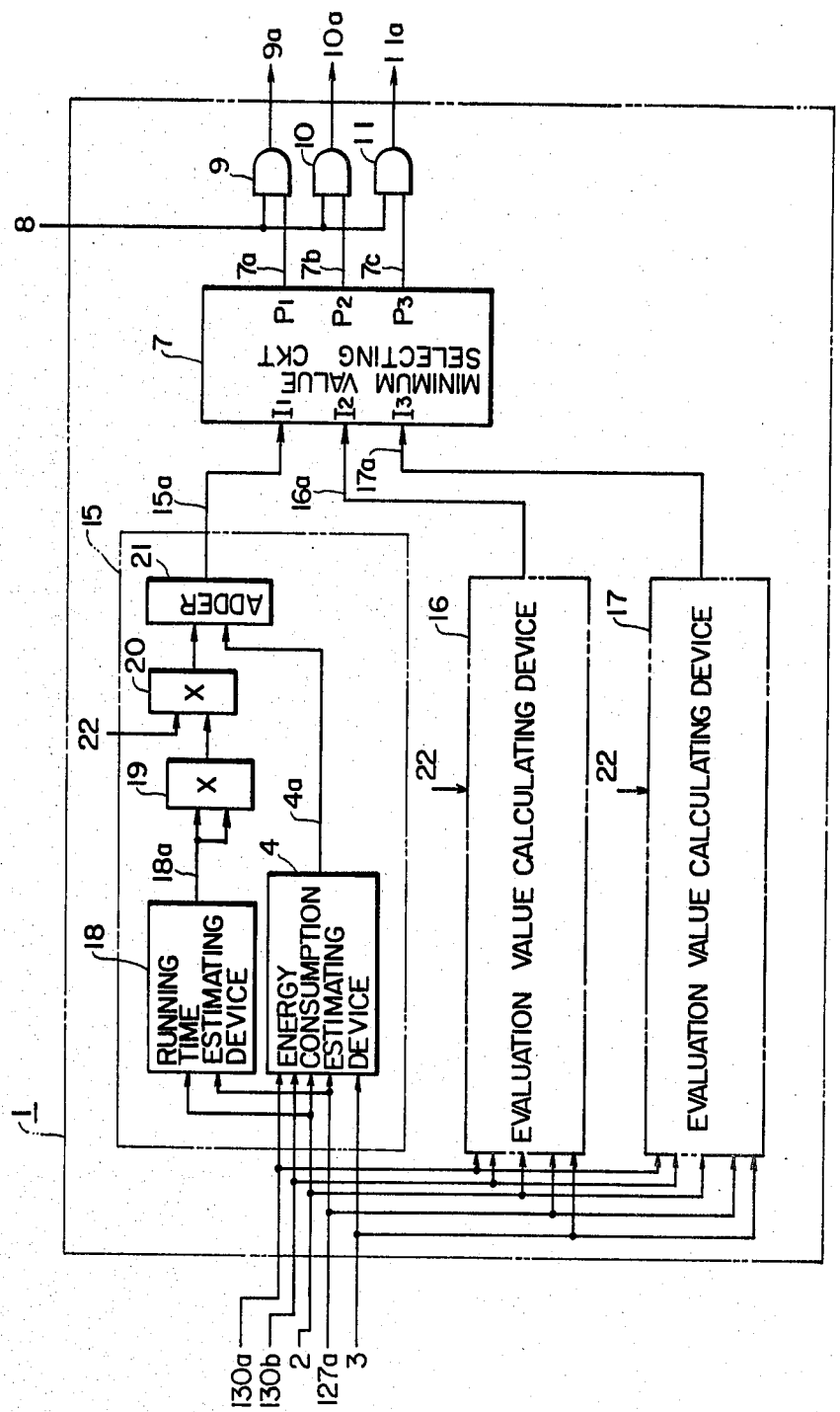
FIG. 9 is a block diagram showing another embodiment of an elevator control system of the invention.

In FIG. 9, reference numerals 15, 16 and 17 designate evaluation value calculating devices for calculating evaluation values for determination of the maximum speed of the cage with respect to the maximum speeds 240 m/min, 180 m/min and 120 m/min and to output evaluation value signals 15a, 16a and 17a, respectively. The calculating devices 15, 16 and 17 all have the same construction. Reference numeral 18 designates a running time estimating device implemented with a microprocessor (INTEL type 8085) as in the energy consumption estimating device 4. The device 18 estimates the running time (the sum of the acceleration time, the constant speed running time and the deceleration time) which is required for the cage to run from one floor to the next stop-designated floor and to output a running time signal 18a.

Further in FIG. 9, reference numeral 19 and 20 designate multipliers for squaring the input thereto which are made up of four SN54284 and four SN54285 integrated circuits (Texas Instruments types), 21 an adder composed of two SN7483AN integrated circuits (Texas Instruments), and 22 a constant value signal representing a constant value (=0.5). The remaining reference numerals represent components similar to those shown in FIG. 2.

Figure 10:
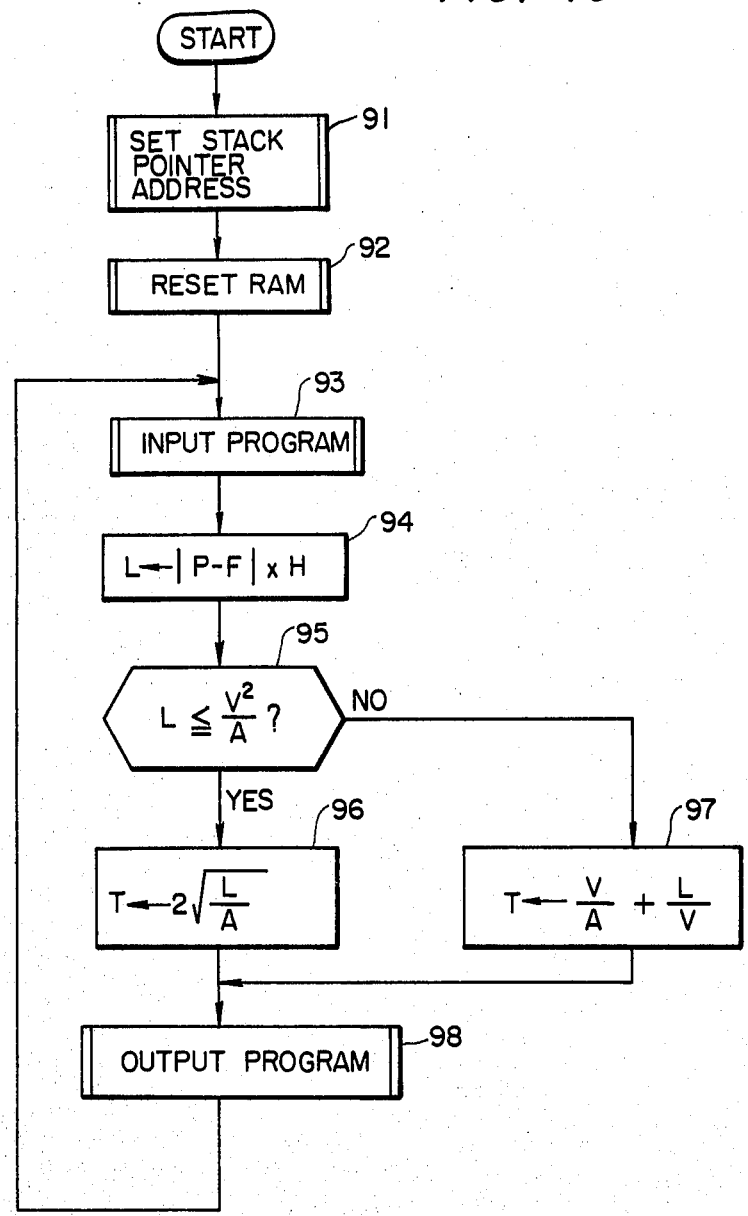
FIG. 10 is a flow chart, corresponding to FIG. 6, showing operating steps of a running time estimating device in FIG. 9.

In FIG. 10, reference numerals numerals 91 through 98 designate operating steps in the running time estimating devices 18, T data representative of the estimation value of a running time with the data T being set in the RAM in the device 18 which corresponds to the RAM 45 in the energy consumption estimating device 4.

The operation of the second embodiment of the invention will now be described. It is assumed that, similar to the case of FIG. 2, the cage is on the first floor and is going to start in response to an upward call from the fifth floor.

The running time estimating device 18 estimates a running time according to the following expressions, which are well known in the art:

$$T = 2\sqrt{L/A} \quad \text{(when } L \leq V^2/A\text{), and} \tag{5}$$

$$= V/A + L/V \text{ (when } L > V^2/A\text{).} \tag{6}$$

where T is the estimation value of a running time and L and A are the same as in the expression (1) through (4) described above.

In the case where the maximum speed of the cage is 240 m/min (or $V=4$ m/sec), upon activating the running time estimating device 18, the programs (91 through 18) stored in the ROM are activated. First, in Step 91, a stack pointer address is set, and in Step 92 all the data in the RAM is cleared. Next, according to the input program (93), through the input port the content of the cage position floor 127a is set with cage position floor data P and the content of the stop-designated floor spignal 2 is set with stop-designated floor data F. Similarly as in the case of FIG. 4, with $H=3.5$ m/floor, $A=1$ m/sec$^2$, and $V=4$ m/sec, the running distance $L=|5-1|\times 3.5=14$ m is calculated in Step 94. Because $L<V^2/A$ ($=16$) in Step 95, the operation is advanced to Step 96 where the running time $T=2\sqrt{14/1}=7.5$ seconds (Expression (5)) is calculated. According to the output program in Step 98, a running time signal 18a representing 7.5 seconds is outputted through the output port. This signal is processed by multipliers 19 and 20 from which the output signal is:

$$7.5^2 \times 0.5 = 28.1.$$

On the other hand, if the cage load is 100%, the estimated value of energy required for the cage to reach the fifth floor is calculated by the energy consumption estimating device 4 similarly as in the case of FIG. 2, and the energy consumption signal 4a representing 56 watt-seconds is outputted. Accordingly, the adder outputs the evaluation value signal 15a representing $28.1+56.0\approx 84$ (the fraction of the addition result being rounded off).

Similarly, in the case of the maximum speed of 180 m/min (or $V=3$ m/sec), the estimated running time is 7.7 seconds according to the expression (6), and the estimated value of energy is 53 watt-seconds. Therefore, the evaluation value calculating device 16 outputs an evaluation value signal 16a representing ($7.7^2\times 0.5+53\approx 82$).

In the case of the maximum speed of 120 m/min (or $V=2$ m/sec), the estimated value of the running time is 9.0 seconds according to the expression (6), and the estimated value of energy consumption is 55 watt-seconds. Therefore, an evaluation value signal 17a represents $9.0^2\times 0.5+55\approx 95$.

Therefore, the signal 16a at the terminal I$_2$, having the minimum value, is selected by the minimum value selecting circuit 7. The output selection signal 7b is at "H" and the remaining output signals 7a and 7c are at "L". Thus, in this case, the maximum speed is set to 180 m/min.

If the cage is moved from the first floor to the fifth floor with a 50% load, the evaluation value signals 15a, 16a and 17a outputted represent $7.5^2\times 0.5+46\approx 74$, $7.7^2\times 0.5+41\approx 70$ and $9.0^2\times 0.5+37\approx 77$ for maximum speeds of 240 m/min, 180 m/min and 120 m/min, respectively. Therefore, in this case, the maximum speed is set to 180 m/min, different from 120 m/min in the case of FIG. 2. This means that, where the running time is long, the cage is allowed to reach the designated floor earlier at the sacrifice of energy consumption.

In this embodiment, as described above, the running time and the energy consumption are estimated, and the maximum speed is selected for running the cage such that the evaluation value of the running time and the energy consumption in combination is a minimum. Therefore, the cage can be run with a minimum energy consumption without increasing the running time.

In the above-described embodiments, three maximum speeds of 240 m/min, 180 m/min and 120 m/min are employed. However, the invention is not limited thereto or thereby. In fact, if the number of maximum speeds is increased, then a more suitable maximum speed can be selected for running the cage with a minimum energy consumption.

Furthermore, in the embodiments described, the maximum speed is determined with the acceleration being constant. However, the invention is not limited thereto or thereby. Specifically, if a plurality of accelerations are provided for the various maximum speeds, the cage an be run more effectively with a minimum energy consumption. In this case, energy consumption and running times are estimated for all combinations of accelerations and maximum speeds and the one of the combinations which provides the minimum energy consumption or minimum evaluation value is selected.

In the above-described embodiments, the energy consumption curves are approximated as shown in FIG. 8, that is, the approximation assumes the energy consumption during the deceleration period is zero and the energy consumption during constant speed running when the cage is moved upwardly with no load is also zero. However, depending on the hoisting unit or motor generator used, sometimes the electric energy recovered cannot be neglected. In such a case, the power consumption should be estimated by taking into account that the power consumption is reduced by as much as the recovered electric power. In practice, in order to made the passengers in the cage comfortable, the acceleration should gradually be increased or decreased. Therefore, if the change of acceleration is taken into account, the energy consumption and the running time can be more accurately estimated, and accordingly the energy consumption can ge reduced more.

In the above-described embodiment, before the cage starts running, the energy consumption estimating devices estimate energy consumption from the approximate curves. However, if power consumptions are estimated or actually measured separately according to the running conditions such as cage load, running distance, running direction, maximum speed and acceleration and this information stored in the ROMs 44, then the energy consumption estimating devices can be modified so that, immediately before the cage starts running, the above-described estimated or measured values are outputted as the energy consumption signals 4a, 5a and 6a according to the running conditions at that time.

Furthermore, in the above-described embodiments, the energy consumption estimating devices and the running time estimating devices are implemented with individual microprocessors. However, it is possible to estimate the energy consumptions and the running times with the maximum speeds using only one microprocessor. It is also possible to obtain the speed set values using only one microprocessor.

In the case of FIG. 4, the square of the estimated value of the running time is multiplied by a coefficient and the result is added to the estimated value of energy consumption to obtain the evaluation value. However, a system wherein, where the running time is long, the maximum cage speed is increased to allow the cage to reach the designated floor earlier at the sacrifice of power consumption is within the scope of the invention. The estimated value of running time is squared in order that, as the running time increases, the percentage of the running time for evaluation is abruptly increased. Therefore, any suitable method can be employed if it can achieve the above-described object. For instance, the estimated value of running time may be cubed. More simply, a method may be employed in which the estimated value of running time is used as it is, multiplied by a coefficient, and the result is added to the estimated value of energy consumption to obtain the evaluation value. In addition, a method may be employed in which, for a cage speed in a range in which the running time is shorter than a period of time present for every floor-distance, an estimated energy consumption is employed as the evaluation value, or in contrast, for a cage speed in a ragne in which energy consumption is less than a predetermined value, an estimated running time is employed as the evaluation value. In addition to the above-described combination of running time and energy consumption, combinations through multiplication thereof may be employed.

It is evident that the technical concept of the invention is applicable to a case where a waiting time which elapses from the time instant that a floor call is made for the cage is estimated to set the cage speed such that the energy consumption is minimized but the waiting time is not increased, and to a case where a period of time during which a person stays in the cage is estimated to set the cage speed such that the energy consumption is minimized but the period of time is not increased.

As is apparent from the above description, in accordance with the invention, the energy consumption required for the cage to run to the next floor is estimated, the cage speed is determined so that the energy consumption thus estimated is minimized, and the cage is run with a speed pattern according thereto. Therefore, the cage can be run with a minimum total energy consumption at all times.

Furthermore, in accordance with the invention, the evaluation value is obtained from an estimation of energy consumption and running time, and the cage speed is set so that the evaluation value is minimized. Therefore, the cage can be run with a minimum energy consumption, but the running time is not increased.

What is claimed is:

1. An elevator control system for operating the cage of an elevator at a speed according to a speed pattern, comprising:
    energy consumption estimating means for estimating an amount of energy required for said cage to run to a floor where said cage is to be next stopped;
    speed setting means for setting a speed for said cage to run to said floor at which said amount of energy is minimized; and
    speed pattern generating means for generating a speed pattern corresponding to said cage speed set by said speed setting means.

2. An elevator control system for operating the cage of an elevator at a speed according to a speed pattern, comprising:
    energy consumption estimating means for estimating an amount of energy required for said cage to run to a floor where said cage is to be next stopped;

running time estimating means for estimating a running time required for said cage to run to said floor;

speed setting means for determining an evaluating time value from said amount of energy estimated by said energy consumption estimating means and said running time estimated by said running time estimating means to set as a cage speed at which said cage runs to said floor a speed at which said evaluation time value is minimized; and speed pattern generating means for generating a speed pattern in correspondence to said cage speed set by said speed setting means.

3. An elevator control system for operating the cage of an elevator at a speed according to a speed pattern, comprising:

a plurality of energy consumption estimating means for estimating an amount of energy required for said cage to run to a floor where said cage is to next stopped, each of said energy consumption estimating means estimating an amount of energy for a predetermined fixed maximum speed of said elevator cage, said predetermined fixed maximum speed of said elevator cage being different for different ones of said energy consumption estimating means;

a minimum value selection circuit means having inputs coupled to each of said energy consumption estimating means, said minimum value selection circuit means outputting a signal indicative of which of said energy consumption estimating means is outputting a minimum value among said energy consumption estimating means;

speed pattern generating means for generating a speed pattern in correspondence to outputs of said minimum value selection circuit means indicative of which of said energy consumption estimating means is producing the minimum value; and means for operating said elevator cage in accordance with a speed pattern outputted by said speed pattern generating device.

4. The elevator control system for operating the cage of an elevator of claim 3 wherein each of said energy consumption estimating means comprises a microcomputer system.

5. The elevator control system for operating the cage of an elevator of claim 4 wherein each said microcomputer system produces an estimated energy consumption in accordance with:

$$E = B \times \sqrt{L/A} \text{ when } L \leq V^2/A, \text{ and}$$

$$= B \times V/A + C \times (L/V - V/A), \text{ when } L > V^2/A,$$

where $$\left. \begin{array}{l} B = (B_1 - B_0) \times W/100 + B_0, \\ C = C_1 \times W/100, \end{array} \right\} \begin{array}{l} \text{for} \\ \text{upward} \\ \text{movement} \end{array}$$

$$\left. \begin{array}{l} B = (B_1 - B_0) \times (100 - W)/100 + B_0, \\ C = C_1 \times (100 - W)/100, \end{array} \right\} \begin{array}{l} \text{for} \\ \text{downward} \\ \text{movement} \end{array}$$

$E$: estimated energy consumption (watt-seconds),
$B_1$: power consumption (watts) for upward acceleration under 100% load,
$B_0$: power consumption (watts) for upward acceleration under 0% load,
$C_1$: power consumption (watts) when the cage is run upwardly at a constant speed with 100% load, and
$L$: running distance (m)
$L = |P - F| \times H$
where,
$P$: cage position floor (floor),
$F$: stop-designated floor (floor),
$H$: floor height (m/floor),
$A$: cage acceleration (m/sec$^2$), and
$V$: cage maximum speed (m/sec).

6. The elevator control system for operating the cage of an elevator of claim 4 wherein each said energy consumption estimating means further comprises running time estimating means for estimating a running time required for said cage to run to said floor; means for squaring an output of said running time estimating means; means for multiplying an output of said squaring means by a constant value; and means for adding an output of said multiplying means to an output of said microcomputer system representing an estimated amount of energy required for said cage to run to a floor where said cage is to be next stopped for a predetermined fixed maximum speed of said cage.

* * * * *